United States Patent
Kawai et al.

(10) Patent No.: US 12,486,089 B2
(45) Date of Patent: Dec. 2, 2025

(54) RESIN-COATED METAL SHEET FOR CONTAINER

(71) Applicant: JFE Steel Corporation, Tokyo (JP)

(72) Inventors: Yuya Kawai, Tokyo (JP); Junichi Kitagawa, Tokyo (JP); Yasuhide Oshima, Tokyo (JP); Katsumi Kojima, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 464 days.

(21) Appl. No.: 16/771,272

(22) PCT Filed: Oct. 12, 2018

(86) PCT No.: PCT/JP2018/038070
§ 371 (c)(1),
(2) Date: Jun. 10, 2020

(87) PCT Pub. No.: WO2019/116707
PCT Pub. Date: Jun. 20, 2019

(65) Prior Publication Data
US 2020/0377274 A1    Dec. 3, 2020

(30) Foreign Application Priority Data
Dec. 15, 2017   (JP) .................................. 2017-240113

(51) Int. Cl.
*B32B 1/02* (2006.01)
*B32B 15/09* (2006.01)
(Continued)

(52) U.S. Cl.
CPC .............. *B65D 65/40* (2013.01); *B32B 15/09* (2013.01); *B32B 15/18* (2013.01); *B32B 27/08* (2013.01);
(Continued)

(58) Field of Classification Search
CPC ........... B32B 1/02; B32B 15/08; B32B 27/32; B32B 27/36; Y10T 428/1352; Y10T 428/31786; Y10T 428/31855; C08F 8/00
(Continued)

(56) References Cited

U.S. PATENT DOCUMENTS

| | | |
|---|---|---|
| 4,800,033 A | 1/1989 | Stetter et al. |
| 5,179,854 A | 1/1993 | Matsui et al. |

(Continued)

FOREIGN PATENT DOCUMENTS

| | | |
|---|---|---|
| CN | 102218881 A | 10/2011 |
| CN | 107206778 A | 9/2017 |

(Continued)

OTHER PUBLICATIONS

Owens et al., Journal of Applied Polymer Science, vol. 13, pp. 1741-1747 (1969).*

(Continued)

*Primary Examiner* — Marc A Patterson
(74) *Attorney, Agent, or Firm* — Buchanan Ingersoll & Rooney, PC

(57) ABSTRACT

A resin-coated metal sheet for a container includes: a metal sheet; a first resin coating layer provided on an inner face of the metal sheet after forming; and a second resin coating layer provided on an outer face of the metal sheet after forming, wherein a polar component of surface free energy of the second resin coating layer is 3.5 mN/m or more, after the second resin coating layer is subjected to heat treatment at a melting point of the second resin coating layer plus 8° C. for 2 minutes, and a static friction coefficient of the second resin coating layer, at 145° C., is 0.16 or less.

17 Claims, 1 Drawing Sheet

(51) Int. Cl.
- *B32B 15/18* (2006.01)
- *B32B 27/08* (2006.01)
- *B32B 27/20* (2006.01)
- *B32B 27/36* (2006.01)
- *B32B 37/18* (2006.01)
- *B32B 38/00* (2006.01)
- *B65D 65/40* (2006.01)
- *B32B 1/08* (2006.01)

(52) U.S. Cl.
CPC .............. *B32B 27/20* (2013.01); *B32B 27/36* (2013.01); *B32B 37/182* (2013.01); *B32B 38/0012* (2013.01); *B32B 2038/0028* (2013.01); *B32B 2264/102* (2013.01); *B32B 2307/518* (2013.01); *B32B 2439/00* (2013.01)

(58) Field of Classification Search
USPC ........................................ 428/35.7, 480, 500
See application file for complete search history.

(56) References Cited

U.S. PATENT DOCUMENTS

| | | | | |
|---|---|---|---|---|
| 5,643,471 | A * | 7/1997 | Onishi | ................ G02F 1/13394 216/23 |
| 6,046,141 | A * | 4/2000 | Kurz | ........................ C08L 77/06 508/100 |
| 6,211,303 | B1 * | 4/2001 | Hohner | ..................... C08F 8/06 525/327.9 |
| 10,589,490 | B2 * | 3/2020 | Sakamoto | ........... B29C 48/0018 |
| 2004/0101698 | A1 | 5/2004 | Yamanaka et al. | |
| 2007/0040150 | A1 | 2/2007 | Keiichiro et al. | |
| 2008/0095982 | A1 * | 4/2008 | Ae | .......................... B29C 45/56 264/328.11 |
| 2009/0068481 | A1 | 3/2009 | Yamanaka et al. | |
| 2018/0272679 | A1 | 9/2018 | Sakamoto et al. | |

FOREIGN PATENT DOCUMENTS

| | | | |
|---|---|---|---|
| EP | 3263335 | A1 | 1/2018 |
| JP | 62503038 | A | 12/1987 |
| JP | 02303634 | A | 12/1990 |
| JP | 04091825 | A | 3/1992 |
| JP | 08169098 | A | 7/1996 |
| JP | 2001088241 | A | 4/2001 |
| JP | 2004130536 | A | 4/2004 |
| JP | 2004148324 | A | 5/2004 |
| JP | 2008168122 | A | 6/2006 |
| JP | 2007030404 | A | 2/2007 |
| JP | 2007099332 | A | 4/2007 |
| JP | 4906984 | B2 | 3/2012 |
| JP | 2017030210 | A | 2/2017 |
| KR | 1020170126851 | A | 11/2017 |
| WO | 2007013657 | A1 | 2/2007 |
| WO | 2016136615 | A1 | 9/2016 |

OTHER PUBLICATIONS

Extended European Search Report for European Application No. 18888749.1, dated Jan. 15, 2021, 8 pages.
Ikada et al., "Surface Energy of Polymers (3)", Journal of the Adhesion Society of Japan, 15, 91 (1979), 11 pages.
International Search Report and Written Opinion for International Application PCT/JP2018/038070, dated Dec. 4, 2018, 8 pages.
Japanese Office Action for Japanese Application No. 2019-503577, dated Sep. 27, 2019, with Concise Statement of Relevance of Office Action, 7 pages.
Chinese Office Action for Chinese Application No. 201880079737.3, dated Nov. 2, 2021 with Englsih Search Report, 11 pages.
Korean Notice of Reason for Refusal for Korean Application No. 10-2020-7016895, dated Oct. 29, 2021 with Translation, 13 pages.
Korean Office Action for Korean Application No. 10-2020-7016895, dated Apr. 28, 2022 with Concise Statement of Relevance of Office Action, 7 pages.

\* cited by examiner

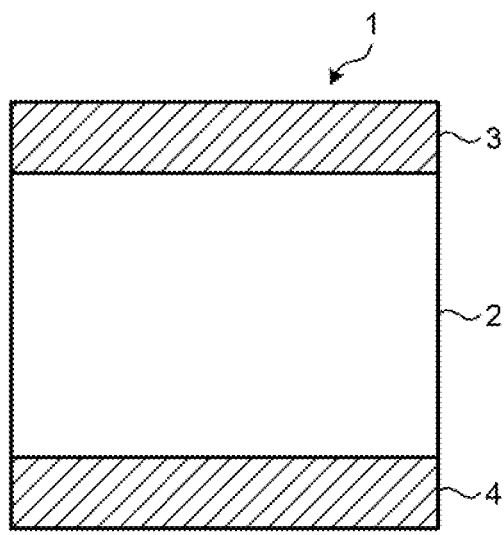
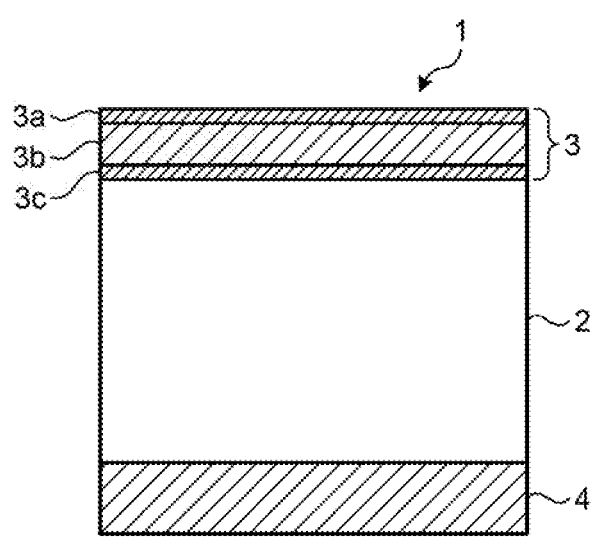

RESIN-COATED METAL SHEET FOR CONTAINER

CROSS REFERENCE TO RELATED APPLICATIONS

This is the U.S. National Phase application of PCT/JP2018/038070, filed Oct. 12, 2018, which claims priority to Japanese Patent Application No. 2017-240113, filed Dec. 15, 2017, the disclosures of these applications being incorporated herein by reference in their entireties for all purposes.

FIELD OF THE INVENTION

The present invention relates to a resin-coated metal sheet for a container including a resin coating layer on each face of a metal sheet.

BACKGROUND OF THE INVENTION

In general, metal containers are broadly divided into a two-piece can and a three-piece can. The two-piece can is a metal container including two parts, which are a can body integral with a can bottom, and a lid. On the other hand, the three-piece can is a metal container including three parts, which are a can barrel, an upper lid, and a bottom lid. Although the two-piece can has no welded part in the can body and thus has good appearance, a high degree of processing is required in general.

Conventionally, coating has been applied to metal sheets such as tin free steel (TFS) and aluminum used as materials for metal containers for the purpose of improvement in corrosion resistance and weatherability. However, techniques for application of the coating have problems in that a long processing time is required for complicated coating and baking processes and besides a large amount of solvents are discharged. Given these circumstances, to solve these problems, a resin-coated metal sheet for a container having a thermoplastic film on the surface of the metal sheet has been developed and is being currently used industrially widely, notably for materials for a beverage can.

In recent years, in view of a reduction in materials costs and resource savings, material sheets for use in metal cans have been reduced in thickness. When a can body with the same shape is manufactured using a thinned material, the degree of processing is high, and thus breaking or scraping may occur especially in a resin coating layer of a resin-coated metal sheet to be positioned on an outer face side of a metal container. Given these circumstances, to manufacture a can body of the two-piece can with a high degree of processing, material design preventing breaking or scraping of the resin coating layer is required.

Furthermore, various kinds of printing are performed on the resin coating layer on the outer face side of a metal can in order to improve design characteristics; when affinity between printing ink and the resin coating layer is low, the adhesiveness of the printing ink may not be able to be ensured, and separation of the printing ink may impair good appearance. Given these circumstances, material design improving affinity with the printing ink is required for the resin coating layer on the outer face side of a metal can.

As techniques for manufacturing two-piece can bodies with the resin-coated metal sheet for a container as a material, techniques such as drawing and drawing and ironing (DI) have been developed (refer to Patent Literature 1, Literature 2, and Literature 3). Also developed are techniques adding a white pigment to the resin coating layer to be positioned on an outer face side of a metal can after forming so as to enable processing to improve the design characteristics of can bodies such as printing (refer to Patent Literature 4 and Literature 5). In addition, as a technique inhibiting breaking or scraping of the resin coating layer when the two-piece can with a high degree of processing is manufactured, a technique adding a lubricant component to the resin coating layer is also developed (refer to Patent Literature 6).

PATENT LITERATURE

Patent Literature 1: Japanese Patent Application Laid-open No. H02-303634
Patent Literature 2: Japanese Patent Application Laid-open No. H04-91825
Patent Literature 3: Japanese Patent Application Laid-open No. 2004-148324
Patent Literature 4: Japanese Patent Application Laid-open No. H08-169098
Patent Literature 5: Japanese Patent Application Laid-open No. 2004-130536
Patent Literature 6: Japanese Patent Application Laid-open No. 2017-30210

Non Patent Literature

Non Patent Literature 1: Y. Ikada and T. Matsunaga: Journal of the Adhesion Society of Japan, 15, 91 (1979).

SUMMARY OF THE INVENTION

As described above, to inhibit breaking or scraping of the resin coating layer when the two-piece can with a high degree of processing is manufactured, the slidability of the surface of the resin coating layer is required to be ensured to improve formability by any method such as one adding the lubricant component to the resin coating layer. However, addition of the lubricant component may hinder adhesion between the resin coating layer and the printing ink and cause good appearance to be impaired. Given these characteristics, the conventional techniques do not achieve both required formability and ink adhesiveness, and such a resin-coated metal sheet for a container has yet to be obtained that can achieve both inhibition of breaking or scraping of the resin coating layer along with processing and good appearance after printing.

The technique described in Patent Literature 6 adds the lubricant component to the resin coating layer and controls a water contact angle of the resin coating layer to achieve both formability and ink adhesiveness. However, to obtain formability enabling can forming with a high degree of processing, prescribing the content of the lubricant component alone is insufficient, and the slidability of the surface of the resin coating layer is required to appropriately be controlled. Ink adhesiveness is improved by controlling the water contact angle; a hydrophobic surface with a water contact angle of as large as 80 degrees or more may not be able to sufficiently obtain affinity with the printing ink, and the printing ink may separate during such processes after printing as contents filling, lid seaming, and transportation.

Aspects of the present invention have been made in view of the above problems, and an object thereof is to provide a resin-coated metal sheet for a container that can achieve both inhibition of breaking or scraping of the resin coating layer along with processing and good appearance after printing.

The inventors of the present invention have conducted earnest studies in order to solve the above problems. Consequently, the inventors of the present invention have obtained knowledge below. Specifically, the inventors of the present invention have found out that when forming with a high degree of processing is performed, to inhibit breaking or scraping of the resin coating layer, affinity with a mold is required to be reduced by adding a lubricant component to the resin coating layer to make a static friction coefficient at 145° C. of the surface of the resin coating layer a specific value or less. The temperature 145° C. is a temperature immediately below a temperature range in which the resin is crystallized and is considered to be the harshest temperature condition during processing, and thus this temperature was selected as a representative temperature. When the value of the static friction coefficient of the surface of the resin coating layer is large, a large shear stress occurs in the resin coating layer when can forming with a high degree of processing is performed, causing breaking or scraping of the resin coating layer.

In addition, the inventors of the present invention have found out that control of a polar component of surface free energy is important for adhesiveness between the resin coating layer and printing ink having a polar group (an ester bond or the like). As printing ink for a polyester resin, printing ink with a polyester resin or the like as a main component is frequently used, and the printing ink adheres to the resin coating layer through an intermolecular force between a resin component in the printing ink and the surface of the resin coating layer. Given these circumstances, to obtain sufficient adhesiveness of the printing ink, the value of the polar component of the surface free energy of the resin coating layer after being subjected to heat treatment at the melting point of the resin coating layer plus 8° C. for 2 minutes is required to be a specific value or more to ensure the intermolecular force with the resin component in the printing ink. When heating is performed in a temperature range greater than the melting point of the resin coating layer, the resin tends to melt to reduce surface polarity, which is a harsh condition disadvantageous for ink adhesiveness, and thus the temperature of the melting point of the resin coating layer plus 8° C. was selected as a representative temperature.

The inventors of the present invention have found out that both the static friction coefficient and the polar component of the surface free energy are controlled, whereby a resin-coated metal sheet for a container can be obtained that achieves both inhibition of breaking or scraping of the resin coating layer along with processing and good appearance after printing. Furthermore, the inventors of the present invention have found out that the weight average molecular weight and the acid value of the lubricant component to be added to the resin coating layer are controlled to be within specific ranges, whereby a resin-coated metal sheet for a container can be obtained that achieves both inhibition of breaking or scraping of the resin coating layer along with processing and good appearance after printing. Aspects of the present invention have been made based on the above knowledge and the gist thereof is as follows.

To solve the problem and achieve the object, a resin-coated metal sheet for a container according to aspects of the present invention includes: resin coating layers on two faces of a metal sheet, wherein a polar component of surface free energy of a resin coating layer to be positioned on an outer face side of the container is 3.5 mN/m or more, after the resin coating layer to be positioned on the outer face side of the container after forming is subjected to heat treatment at a melting point of the resin coating layer plus 8° C. for 2 minutes, and a static friction coefficient of the resin coating layer to be positioned on the outer face side of the container after forming, at 145° C., is 0.16 or less.

Moreover, in the resin-coated metal sheet for the container according to aspects of the present invention, the resin coating layer to be positioned on the outer face side of the container after forming has a polyester resin having a melting point of 230° C. to 254° C. as a main component.

Moreover, in the resin-coated metal sheet for the container according to aspects of the present invention, the resin coating layer to be positioned on the outer face side of the container after forming contains 0.010% by mass to 1.0% by mass of a lubricant component.

Moreover, in the resin-coated metal sheet for the container according to aspects of the present invention, the lubricant component contained in the resin coating layer to be positioned on the outer face side of the container after forming is an acid-modified polyolefin or an oxidized polyolefin with an acid value of 1.0 mg KOH/g to 100 mg KOH/g. Further, a weight average molecular weight of the lubricant component is 2,500 or more and less than 80,000. Furthermore, the resin coating layer to be positioned on the outer face side of the container after forming contains 30% by mass or less of titanium oxide.

Moreover, in the resin-coated metal sheet for the container according to aspects of the present invention, the resin coating layer to be positioned on the outer face side of the container after forming has at least a three-layer structure including an outermost layer, an intermediate layer, and a lowermost layer, thicknesses of the outermost layer and the lowermost layer are 1.0 μm to 5.0 μm, a thickness of the intermediate layer is 6.0 μm to 30 μm, each of the outermost layer and the lowermost layer contains 0.0% by mass to 2.0% by mass of titanium oxide, and the intermediate layer contains 10% by mass to 30% by mass of titanium oxide.

Aspects of the present invention can provide a resin-coated metal sheet for a container that can achieve both inhibition of breaking or scraping of the resin coating layer and good appearance after printing.

BRIEF DESCRIPTION OF THE DRAWING

FIGS. 1(a) and 1(b) are sectional views of configurations of a resin-coated metal sheet for a container as an embodiment of the present invention.

DETAILED DESCRIPTION OF EMBODIMENTS OF THE INVENTION

The following describes a resin-coated metal sheet for a container as an embodiment of the present invention. In the following, "%" indicates "% by mass" unless otherwise specified.

FIG. 1(a) and FIG. 1(b) are sectional views of configurations of the resin-coated metal sheet for a container as the embodiment of the present invention. As illustrated in FIG. 1(a), this resin-coated metal sheet 1 for a container as the embodiment of the present invention includes a metal sheet 2, a resin coating layer 3 formed on a front face side of the metal sheet 2, and a resin coating layer 4 formed on a back face side of the metal sheet 2. The resin coating layer 3 and the resin coating layer 4 are positioned on an outer face side and an inner face side, respectively, of a metal container after forming.

The metal sheet 2 is formed of a steel sheet such as tin or tin free steel. As tin, one with a plating amount within a range of 0.5 g/m$^2$ or more and 15 g/m$^2$ or less is preferably used. Tin free steel preferably has a metal chromium layer with an adhesion amount within a range of 50 mg/m$^2$ or more and 200 g/m$^2$ or less and a chromium oxide layer with an adhesion amount in terms of the metal chromium layer within a range of 3 mg/m$^2$ or more and 30 g/m$^2$ or less on a surface thereof. The type of the steel sheet is not limited to a particular one so long as it can be formed into a desired shape; ones with the following components and methods of production are preferred.
  (1) One subjected to recrystallization annealing by continuous annealing using a low carbon steel having a C (carbon) amount within a range of about 0.010% or more and 0.10% or less.
  (2) One subjected to recrystallization annealing and overaging treatment by continuous annealing using a low carbon steel having a C amount within a range of about 0.010% or more and 0.10% or less.
  (3) One subjected to recrystallization annealing by box annealing using a low carbon steel having a C amount within a range of about 0.010% or more and 0.10% or less.
  (4) One subjected to recrystallization annealing by continuous annealing or box annealing and then secondary cold rolling (double reduced (DR) rolling) using a low carbon steel having a C amount within a range of about 0.010% or more and 0.10% or less.
  (5) One subjected to recrystallization annealing by continuous annealing using an interstitial free (IF) steel, in which elements, such as Nb and Ti, fixing C dissolved as a solid-solution are added to an extremely low carbon steel having a C amount within a range of about 0.003% or less.

The mechanical characteristics of the steel sheet are not limited to particular ones so long as the steel sheet can be formed into a desired shape; not to impair formability and to ensure sufficient can body strength. One having a yield point (YP) within a range of about 220 MPa or more and 580 MPa or less is preferably used. As to the Lankford value (the r value) as an indicator of plastic anisotropy, one with a value of 0.8 or more is preferred. Furthermore, as to the in-plane anisotropy Δr of the r value, one with an absolute value thereof of 0.7 or less is preferred.

Steel components for achieving the above characteristics are not limited to particular ones; components such as Si, Mn, P, S, Al, and N may be contained, for example. It is preferred that a Si content is within a range of 0.001% or more and 0.1% or less, a Mn content is within a range of 0.01% or more and 0.6% or less, a P content is within a range of 0.002% or more and 0.05% or less, a S content is within a range of 0.002% or more and 0.05% or less, an Al content is within a range of 0.005% or more and 0.100% or less, and a N content is within a range of 0.0005% or more and 0.020% or less. Other components such as Ti, Nb, B, Cu, Ni, Cr, Mo, and V may be contained; in view of ensuring corrosion resistance and the like, the content of these components is preferably 0.02% or less in terms of a total amount.

The static friction coefficient at 145° C. of the resin coating layer 3 is 0.16 or less. The static friction coefficient of the resin coating layer 3 is controlled, whereby a shear stress occurring in the resin coating layer 3 during processing can be reduced, and breaking or scraping of the resin coating layer 3 can be inhibited. When the static friction coefficient at 145° C. is greater than 0.16, a large shear stress occurs in the resin coating layer during continuous can forming, and breaking or scraping of the resin coating layer 3 occurs, which is not preferred.

A polar component of surface free energy of the resin coating layer 3 after being subjected to heat treatment at the melting point of the resin coating layer 3 plus 8° C. for 2 minutes is 3.5 mN/m or more. The polar component of the surface free energy of the resin coating layer 3 is controlled, whereby an intermolecular force between printing ink and the resin coating layer 3 can be increased, and the adhesiveness of the printing ink can be ensured. When the polar component of the surface free energy is less than 3.5 mN/m, the intermolecular force cannot sufficiently be ensured with a resin component in the printing ink, the adhesiveness of the printing ink is insufficient, and ink separation or the like occurs to impair good appearance, which is not preferred.

Various measuring methods and various analyzing methods for the surface free energy are known. The polar component of the surface free energy used in the present embodiment was calculated in accordance with a method of calculation described in Non Patent Literature 1 based on contact angles of water, glycerol, formamide, ethylene glycol, and diethylene glycol. The details of the method of calculation will be described in examples described below.

As described above, the component of the resin coating layer 3 is not limited to a particular one so long as the polar component of the surface free energy of the resin coating layer 3 after being subjected to heat treatment at the melting point of the resin coating layer 3 plus 8° C. for 2 minutes is 3.5 mN/m or more and the static friction coefficient at 145° C. of the resin coating layer 3 is 0.16 or less; a preferred composition achieving these ranges is as follows.

The resin coating layer 3 preferably has a polyester resin having a melting point of 230° C. or more and 254° C. or less as a main component. More preferably, the melting point of the polyester resin is 234° C. or more and 252° C. or less; even more preferably, the melting point of the polyester resin is within a range of 238° C. or more and 250° C. or less. When the melting point of the polyester resin is less than 230° C., the resin may soften through heat applied during continuous forming, and breaking or scraping may occur in the resin coating layer 3. On the other hand, when the melting point of the polyester resin is greater than 254° C., the polyester resin increases in crystallinity to degrade the formability of the resin, which is not preferred.

As raw materials of the polyester resin, various dicarboxylic acid components and glycol components may be used. To the extent that heat resistance and formability are not impaired, a plurality of dicarboxylic acid components and glycol components may be copolymerized. Examples of the dicarboxylic acid components include aromatic dicarboxylic acids such as terephthalic acid, isophthalic acid, naphthalene dicarboxylic acid, diphenyl dicarboxylic acid, diphenyl sulfone dicarboxylic acid, diphenoxyethane dicarboxylic acid, sodium 5-sulfoisophthalate, and phthalic acid; aliphatic dicarboxylic acids such as oxalic acid, succinic acid, adipic acid, sebacic acid, dimer acids, maleic acid, and fumaric acid; alicyclic dicarboxylic acids such as cyclohexane dicarboxylic acid; and oxycarboxylic acids such as p-oxybenzoic acid. Examples of the glycol components include aliphatic glycols such as ethylene glycol, propanediol, butanediol, pentanediol, hexanediol, and neopentyl glycol; alicyclic glycols such as cyclohexane dimethanol; aromatic glycols such as bisphenol A and bisphenol S; and diethylene glycol.

The resin material forming the resin coating layer 3 is not limited by a method for producing the same. In producing the polyester, additives such as fluorescence whitening agents, antioxidants, thermal stabilizers, ultraviolet absorbers, and antistatic agents may be added as needed. To improve whiteness, addition of fluorescence whitening agents is effective.

To reduce the static friction coefficient, the resin coating layer 3 may contain a lubricant component of 0.010% or more and 1.0% or less. When the added amount of the lubricant component is less than 0.010%, the value of the static friction coefficient is large, sufficient slidability may fail to be ensured during can forming, and scraping of the resin coating layer 3 may occur. When the added amount of the lubricant component is greater than 1.0%, the proportion of the lubricant component in the resin coating layer 3 is large, whereby the resin coating layer 3 may soften, and scraping may occur during can forming. The added amount of the lubricant component is preferably 0.020% or more and 0.90% or less and more preferably 0.020% or more and 0.80% or less.

To obtain a high polar component of the surface free energy, the acid value of the lubricant component contained in the resin coating layer 3 may be controlled. The acid value of the lubricant component is preferably 1.0 mg KOH/g or more and 100 mg KOH/g or less, more preferably 1.0 mg KOH/g or more and 50 mg KOH/g or less, and even more preferably 2.0 mg KOH/g or more and 45 mg KOH/g or less. When the acid value of the lubricant component contained in the resin coating layer 3 is less than 1.0 mg KOH/g, affinity between the resin coating layer 3 and the printing ink may decrease, and the lubricant component may be concentrated on the surface of the resin coating layer 3, whereby the adhesiveness of the printing ink may be hindered. On the other hand, when the acid value of the lubricant component contained in the resin coating layer 3 is greater than 100 mg KOH/g, affinity between the resin coating layer 3 and the lubricant component increases to be compatible with each other, a friction coefficient reduction effect required during can forming may fail to be obtained, and scraping may occur during can forming.

The melting point of the lubricant component to be added is preferably 80° C. or more and 230° C. or less. When the lubricant component having a melting point of less than 80° C. is used, the lubricant component is likely to be concentrated on the surface of the resin coating layer 3, and concentration of the lubricant component on the surface of the resin coating layer 3 may reduce the polar component of the surface free energy, and the adhesion of the ink may be hindered. On the other hand, when the melting point of the lubricant component is greater than 230° C., sufficient slidability cannot be obtained during processing. The melting point of the lubricant component to be added is preferably 90° C. or more and 200° C. or less and more preferably 100° C. or more and 180° C. or less.

The lubricant component contained in the resin coating layer 3 is preferably an acid-modified polyolefin or an oxidized polyolefin. These lubricant components are suitable for obtaining the above performance, are excellent in resin properties and in terms of costs, and are suitable for the lubricant component for the resin-coated metal sheet requiring low costs and a high degree of processing as an object according to aspects of the present invention. The weight average molecular weight of the lubricant component is preferably 2,500 or more and less than 80,000. When the weight average molecular weight of the lubricant component is less than 2,500, the mobility of the lubricant component within the resin coating layer 3 is large, the lubricant component may be concentrated on the surface of the resin coating layer 3, and the adhesiveness of the printing ink may be hindered. On the other hand, when the weight average molecular weight of the lubricant component is greater than 80,000, sufficient slidability may fail to be obtained during processing. The weight average molecular weight of the lubricant component is more preferably 3,000 or more and less than 75,000 and even more preferably 3,500 or more and less than 70,000.

The resin coating layer 3 may be required to be white in order to improve design characteristics after printing. In this case, the resin coating layer 3 may contain titanium oxide of 30% or less. The content of titanium oxide is preferably 10% or more and 25% or less and more preferably 12% or more and 20% or less. A lower content of titanium oxide may fail to ensure sufficient whiteness after processing. An excessively high content of titanium oxide may cause a problem with adhesiveness between the metal sheet 2 and the resin coating layer 3 or the formability of the resin coating layer 3 during forming with a high degree of processing.

Titanium oxide to be added to the resin coating layer 3 is not limited to a particular one; one with a purity of rutile type titanium oxide of 90% or more is preferably used. When the purity of rutile type titanium oxide is less than 90%, the dispersibility of titanium oxide is poor during mixing with the resin material, and thus the quality of the resin coating layer 3 is nonuniform, which may be problematic.

As illustrated in FIG. 1(b), the resin coating layer 3 may have at least a three-layer structure including an outermost layer 3a, an intermediate layer 3b, and a lowermost layer 3c. In this case, the thickness of the outermost layer 3a and the lowermost layer 3c is preferably 1.0 μm or more and 5.0 μm or less, more preferably 1.5 μm or more and 4.0 μm or less, and even more preferably 2.0 μm or more and 3.0 μm or less. The thickness of the intermediate layer 3b is preferably 6.0 μm or more and 30 μm or less, more preferably 8.0 μm or more and 25 μm or less, and even more preferably 10 μm or more and 20 μm or less. The outermost layer 3a and the lowermost layer 3c preferably each contain titanium oxide of 0.0% by mass or more and 2.0% by mass or less. The intermediate layer 3b preferably contains titanium oxide of 10% by mass or more and 30% by mass or less.

When the thickness of the outermost layer 3a and the lowermost layer 3c is smaller than 1.0 μm, a luster of the resin coating layer 3 may fail to be ensured sufficiently, or breaking or scraping of the resin coating layer 3 may occur, and thus the thickness of the outermost layer 3a and the lowermost layer 3c is preferably 1.0 μm or more. On the other hand, when the thickness of the outermost layer 3a and the lowermost layer 3c is larger than 5.0 μm, to ensure whiteness, the thickness of the intermediate layer 3b is required to be increased, or the amount of titanium oxide contained in the intermediate layer 3b is required to be increased, which is not preferred in view of economy and formability.

EXAMPLES

Using tin free steel (TFS, metal Cr layer: 120 mg/m$^2$, Cr oxide layer: 10 mg/m$^2$ in terms of metal Cr, tempering degree: T3CA) with a thickness of 0.22 mm as a metal sheet, each face of the metal sheet was coated with each of the resin coating layers of Examples 1 to 31 and Comparative Examples 1 to 17 listed in Tables 1 to 4 below by film laminating (film heat fusion). The coating conditions are as listed in Tables 1 to 4 below. The metal sheet was heated; a film-shaped resin coating layer produced by biaxial stretching was thermocompressed to the metal sheet with a laminate roll and was water-cooled when 1.5 seconds elapsed after thermocompression to produce a sample in which each face of the metal sheet was coated with the resin coating layer.

For the obtained resin-coated metal sheets for a container, the polar component of the surface free energy, the static friction coefficient, and the melting point of the resin coating layer were measured by methods described below.

(1) Polar Component of Surface Free Energy

The resin-coated metal sheet for a container was subjected to heat treatment, by taking 2 minutes, with a hot-air drying furnace, such that the temperature of the resin-coated metal sheet for the container rises to the melting point of the resin coating layer plus 8° C. and was then cooled to room temperature. Subsequently, the polar component of the surface free energy of the resin coating layer to be positioned on an outer face side of a container was evaluated. The polar component of the surface free energy was calculated by a method of calculation described in Non Patent Literature 1 based on contact angles of water, glycerol, formamide, ethylene glycol, and diethylene glycol at 25° C. For the calculation, values of the surface tension and components thereof of the respective liquids listed in Table 5 below and Expression (1) below were used.

$$\gamma_L(\cos\theta+1)/\{2\gamma_L^{P}{}^{(1/2)}\} = \gamma_S^{d}{}^{(1/2)} \times \gamma_L^{d}{}^{(1/2)} / \{\gamma_L^{P}{}^{(1/2)}\} + \gamma_S^{P}{}^{(1/2)} - \pi_e/\{2\gamma_L^{P}{}^{(1/2)}\} \quad (1)$$

Where $\gamma_L$ indicates the surface free energy (mN/m) of a liquid, $\gamma_L^{P}$ indicates the polar component (mN/m) of the surface free energy of a liquid, $\gamma_L^{d}$ indicates the dispersion component of the surface free energy of a liquid, $\gamma_S^{P}$ indicates the polar component (mN/m) of the surface free energy of a solid, $\gamma_S^{d}$ indicates the dispersion component (mN/m) of the surface free energy of a solid, and $\pi_e$ indicates surface pressure (mN/m).

The method of calculation is as follows. For each of the five liquids, the surface tension, the components thereof, and the measured contact angle of the liquid were substituted into Expression (1) to obtain five expressions. With the term $-\pi_e/\{2\gamma_L^{P}{}^{(1/2)}\}$ being zero, $\gamma_L(\cos\theta+1)/\{2\gamma_L^{P}{}^{(1/2)}\}$ being Y, and $\gamma_L^{d}{}^{(1/2)}/\gamma_L^{P}{}^{(1/2)}$ being X, an X-Y plot was created. For five points on the obtained X-Y plot, an approximate line was determined by the method of least squares, and the value of the intercept of the obtained approximate line was squared to calculate the polar component ($\gamma_S^{P}$) of the surface free energy.

(2) Static Friction Coefficient

Measurement of the static friction coefficient was performed using a rotary sliding type friction and wear tester at a test temperature of 145° C., a load of 44 N, and a sliding speed of 775 mm/sec. For an indenter, a carbide alloy ball with a diameter of 10 mm was used. In the present example, a friction coefficient when a maximum static friction coefficient was exhibited was determined to be the static friction coefficient.

(3) Melting Point of Resin Coating Layer

Using a differential scanning calorimetric apparatus, the temperature of the resin coating layer peeled off from the resin-coated metal sheet was raised with a temperature rising rate of 10° C./minute from room temperature to 290° C., and a peak temperature of an endothermic peak within a range of 200° C. or more and 280° C. or less was determined to be the melting point of the resin coating layer. Peeling off of the resin coating layer was performed by immersing the resin-coated metal sheet for a container into a mixed solution of concentrated hydrochloric acid (12 mol/L):distilled water=1:1 at room temperature to dissolve the metal sheet.

For the resin-coated metal sheets for a container of Examples 1 to 31 and Comparative Examples 1 to 17, formability and ink adhesiveness were evaluated by methods described below. Table 6 below lists evaluation results of formability and ink adhesiveness. As listed in Table 6, although the resin-coated metal sheets for a container of Examples 1 to 31 were favorable both in formability and ink adhesiveness, those of Comparative Examples 1 to 17 were insufficient in any evaluation result of formability and ink adhesiveness.

(1) Formability

Paraffin wax was applied to each of the resin-coated metal sheets for a container of Examples 1 to 31 and Comparative Examples 1 to 17, was then punched off into a disc sheet with a diameter of 123 mm, and was drawn into a cup with an inner diameter of 71 mm and a height of 36 mm with a cupping press machine. Subsequently, the obtained cup was put into a DI forming apparatus, and redrawing with a punch speed of 200 mm/second and a stroke of 560 mm and processing with a total reduction rate of 51% (reduction rates of the respective steps: 23%, 25%, and 25%) by three-step ironing were performed to form a can with an inner diameter of 52 mm and a can height of 90 mm. For the formed can, the surface of the resin coating layer was visually observed, and formability was evaluated in accordance with criteria below.

Evaluation "A": No scraping is observed. Evaluation "B": Scraping slightly occurs at a height of 2 mm or less from a can flange part; practically no problem. Evaluation "C": Scraping occurs at a height of greater than 2 mm and 20 mm or less from the can flange part; practically problematic. Evaluation "D": Scraping reaching a height of greater than 20 mm from the can flange part or breakage occurs; practically problematic.

(2) Ink Adhesiveness

The resin-coated metal sheets for a container of Examples 1 to 31 and Comparative Examples 1 to 17 were subjected to heat treatment, by taking 2 minutes, with a hot-air drying furnace, such that the temperature of the resin-coated metal sheets for the container of Examples 1 to 31 and Comparative Examples 1 to 17 rises to the melting point of the resin coating layer plus 8° C. and were then cooled to room temperature. Subsequently, polyester-based printing ink (red) was printed on the resin coating layer to be positioned on an outer face side of a container of each sample, was subjected to heat treatment with a hot-air drying furnace at 180° C. for 5 minutes, and was cooled to room temperature. Using a scratch type coating hardness tester, the obtained face on which the ink had been printed of the sample was scanned from a print end under a load of 500 g at a speed of 10 mm/minute to measure a maximum pencil hardness in which ink separation did not occur, and ink adhesiveness was evaluated in accordance with criteria below. When separation of the printing ink occurs during the processes such as transportation of can bodies, separation from the print end is frequently perceived as a problem, and thus evaluation was performed with scanning started from the print end.

Evaluation "A": pencil hardness of 3H or more. Evaluation "B": pencil harness of 2H; practically no problem. Evaluation "C": pencil harness of H; practically problematic. Evaluation "D": pencil harness of F or less; practically problematic.

TABLE 1

| | Resin composition [mol %] | TiO₂ amount [wt %] | Lubricant component | Acid value of lubricant component [mg KOH/g] | Weight average molecular weight of lubricant component | Melting point of lubricant component [° C.] | Added amount of lubricant component [wt %] | Thickness [µm] | Resin melting point [° C.] | Polar component of surface free energy [mN/m] | Static friction coefficient at 145° C. | Laminate conditions | |
|---|---|---|---|---|---|---|---|---|---|---|---|---|---|
| | | | | | | | | | | | | Metal sheet temperature [° C.] | Laminate roll temperature [° C.] |
| Example 1 | Ethylene terephthalate 96 Ethylene isophthalate 4 | 0 | Acid-modified polyethylene | 1.0 | 29000 | 125 | 0.10 | 20 | 247 | 3.6 | 0.13 | 256 | 85 |
| Example 2 | Ethylene terephthalate 96 Ethylene isophthalate 4 | 16 | Acid-modified polyethylene | 2.0 | 24000 | 120 | 0.10 | 20 | 247 | 3.9 | 0.13 | 256 | 85 |
| Example 3 | Ethylene terephthalate 96 Ethylene isophthalate 4 | 16 | Acid-modified polyethylene | 10 | 8400 | 125 | 0.20 | 20 | 247 | 4.6 | 0.12 | 256 | 85 |
| Example 4 | Ethylene terephthalate 96 Ethylene isophthalate 4 | 30 | Acid-modified polyethylene | 25 | 4600 | 110 | 0.20 | 20 | 247 | 4.5 | 0.11 | 256 | 85 |
| Example 5 | Ethylene terephthalate 96 Ethylene isophthalate 4 | 0 | Acid-modified polyethylene | 30 | 23000 | 123 | 0.20 | 20 | 247 | 5.1 | 0.12 | 256 | 85 |
| Example 6 | Ethylene terephthalate 96 Ethylene isophthalate 4 | 16 | Acid-modified polyethylene | 30 | 23000 | 123 | 0.20 | 20 | 247 | 5.0 | 0.12 | 256 | 85 |
| Example 7 | Ethylene terephthalate 96 Ethylene isophthalate 4 | 16 | Acid-modified polyethylene | 30 | 23000 | 123 | 1.0 | 20 | 247 | 3.6 | 0.10 | 256 | 85 |
| Example 8 | Ethylene terephthalate 96 Ethylene isophthalate 4 | 16 | Acid-modified polypropylene | 12 | 69000 | 124 | 0.20 | 20 | 247 | 4.6 | 0.13 | 256 | 85 |
| Example 9 | Ethylene terephthalate 96 Ethylene isophthalate 4 | 16 | Acid-modified polypropylene | 18 | 52000 | 123 | 0.20 | 20 | 247 | 4.8 | 0.13 | 256 | 85 |
| Example 10 | Ethylene terephthalate 96 Ethylene isophthalate 4 | 16 | Acid-modified polypropylene | 18 | 52000 | 123 | 0.40 | 20 | 247 | 4.5 | 0.11 | 256 | 85 |

TABLE 1-continued

| | Resin composition [mol %] | TiO₂ amount [wt %] | Lubricant component | Acid value of lubricant component [mg KOH/g] | Weight average molecular weight of lubricant component | Melting point of lubricant component [° C.] | Added amount of lubricant component [wt %] | Thickness [μm] | Resin melting point [° C.] | Polar component of surface free energy [mN/m] | Static friction coefficient at 145° C. | Metal sheet temperature [° C.] | Laminate roll temperature [° C.] |
|---|---|---|---|---|---|---|---|---|---|---|---|---|---|
| Example 11 | Ethylene terephthalate 96 Ethylene isophthalate 4 | 16 | Acid-modified polypropylene | 45 | 18000 | 134 | 0.20 | 20 | 247 | 4.7 | 0.13 | 256 | 85 |
| Example 12 | Ethylene terephthalate 96 Ethylene isophthalate 4 | 16 | Acid-modified polypropylene | 50 | 30000 | 135 | 0.20 | 20 | 247 | 4.9 | 0.15 | 256 | 85 |
| Example 13 | Ethylene terephthalate 96 Ethylene isophthalate 4 | 16 | Oxidized polyethylene | 15 | 4200 | 105 | 0.20 | 20 | 247 | 4.5 | 0.11 | 256 | 85 |
| Example 14 | Ethylene terephthalate 96 Ethylene isophthalate 4 | 16 | Oxidized polyethylene | 20 | 3000 | 110 | 0.20 | 20 | 247 | 4.4 | 0.12 | 256 | 85 |
| Example 15 | Ethylene terephthalate 96 Ethylene isophthalate 4 | 20 | Oxidized polyethylene | 35 | 8400 | 122 | 0.20 | 20 | 247 | 4.9 | 0.13 | 256 | 85 |
| Example 16 | Ethylene terephthalate 96 Ethylene isophthalate 4 | 16 | Oxidized polypropylene | 10 | 18000 | 112 | 0.20 | 20 | 247 | 4.6 | 0.12 | 256 | 85 |
| Example 17 | Ethylene terephthalate 96 Ethylene isophthalate 4 | 16 | Oxidized polypropylene | 30 | 22000 | 124 | 0.20 | 20 | 247 | 4.9 | 0.12 | 256 | 85 |
| Example 18 | Ethylene terephthalate 96 Ethylene isophthalate 4 | 16 | Oxidized polypropylene | 40 | 34000 | 132 | 0.20 | 20 | 247 | 5.2 | 0.13 | 256 | 85 |
| Example 19 | Ethylene terephthalate 96 Ethylene isophthalate 4 | 16 | Acid-modified polyethylene | 30 | 23000 | 123 | 0.20 | 20 | 244 | 4.6 | 0.12 | 256 | 75 |
| Example 20 | Ethylene terephthalate 90 Ethylene isophthalate 10 | 16 | Acid-modified polyethylene | 30 | 23000 | 123 | 0.20 | 20 | 234 | 4.7 | 0.13 | 248 | 85 |

TABLE 1-continued

| | Resin composition [mol %] | TiO₂ amount [wt %] | Lubricant component | Acid value of lubricant component [mg KOH/g] | Weight average molecular weight of lubricant component | Melting point of lubricant component [° C.] | Added amount of lubricant component [wt %] | Thickness [μm] | Resin melting point [° C.] | Polar component of surface free energy [mN/m] | Static friction coefficient at 145° C. | Laminate conditions Metal sheet temperature [° C.] | Laminate roll temperature [° C.] |
|---|---|---|---|---|---|---|---|---|---|---|---|---|---|
| Example 21 | Ethylene terephthalate 96 Cyclohexane dimethylene terephthalate 4 | 16 | Acid-modified polyethylene | 30 | 23000 | 123 | 0.20 | 20 | 250 | 4.8 | 0.13 | 260 | 85 |

TABLE 2

| | Outermost layer | | | | | | | | Intermediate layer | | |
|---|---|---|---|---|---|---|---|---|---|---|---|
| | Resin composition [mol %] | TiO$_2$ amount [wt %] | Lubricant component | Acid value of lubricant component [mg KOH/g] | Weight average molecular weight of lubricant component | Melting point of lubricant component [°C.] | Added amount of lubricant component [wt %] | Thickness [μm] | Resin composition [mol %] | TiO$_2$ amount [wt %] | Thickness [μm] |
| Example 22 | Ethylene terephthalate 96 Ethylene isophthalate 4 | 0 | Acid-modified poly-ethylene | 10 | 8400 | 125 | 0.8 | 2 | Ethylene terephthalate 96 Ethylene isophthalate 4 | 10 | 16 |
| Example 23 | Ethylene terephthalate 96 Ethylene isophthalate 4 | 0 | Acid-modified poly-ethylene | 30 | 23000 | 123 | 0.4 | 2 | Ethylene terephthalate 96 Ethylene isophthalate 4 | 20 | 16 |
| Example 24 | Ethylene terephthalate 96 Ethylene isophthalate 4 | 0 | Acid-modified poly-ethylene | 30 | 23000 | 123 | 0.6 | 2 | Ethylene terephthalate 96 Ethylene isophthalate 4 | 20 | 16 |
| Example 25 | Ethylene terephthalate 96 Ethylene isophthalate 4 | 0 | Acid-modified poly-ethylene | 30 | 23000 | 123 | 0.8 | 2 | Ethylene terephthalate 96 Ethylene isophthalate 4 | 20 | 16 |
| Example 26 | Ethylene terephthalate 96 Ethylene isophthalate 4 | 2 | Acid-modified poly-ethylene | 30 | 23000 | 123 | 0.5 | 5 | Ethylene terephthalate 96 Ethylene isophthalate 4 | 20 | 18 |
| Example 27 | Ethylene terephthalate 96 Ethylene isophthalate 4 | 0 | Acid-modified poly-propylene | 18 | 52000 | 123 | 0.6 | 2 | Ethylene terephthalate 96 Ethylene isophthalate 4 | 20 | 16 |
| Example 28 | Ethylene terephthalate 96 Ethylene isophthalate 4 | 0 | Acid-modified poly-propylene | 50 | 30000 | 135 | 0.6 | 2 | Ethylene terephthalate 96 Ethylene isophthalate 4 | 20 | 16 |
| Example 29 | Ethylene terephthalate 96 Ethylene isophthalate 4 | 0 | Oxidized poly-ethylene | 20 | 3000 | 110 | 0.8 | 2 | Ethylene terephthalate 96 Ethylene isophthalate 4 | 20 | 16 |
| Example 30 | Ethylene terephthalate 96 Ethylene isophthalate 4 | 0 | Oxidized poly-ethylene | 35 | 8400 | 122 | 0.8 | 2 | Ethylene terephthalate 96 Ethylene isophthalate 4 | 20 | 16 |

TABLE 2-continued

| Example | Lowermost layer | | | | | | | | B | | Entire outer face resin layer | | | | Static friction co-efficient at 145° C. | Laminate conditions | |
| | Resin composition [mol %] | TiO₂ amount [wt %] | Lubricant component | Acid value of lubricant component [mg KOH/g] | Weight average molecular weight of lubricant component | Melting point of lubricant component [°C.] | Added amount of lubricant component [wt %] | Thickness [µm] | TiO₂ amount [wt %] | Thickness [µm] | Resin composition | Added amount of lubricant component [wt %] | Resin melting point [°C.] | Polar component of surface free energy [mN/m] | | Metal sheet temperature [°C.] | Laminate roll temperature [°C.] |
|---|---|---|---|---|---|---|---|---|---|---|---|---|---|---|---|---|---|
| Example 31 | Ethylene terephthalate 96 Ethylene isophthalate 4 | 0 | Oxidized polypropylene | 30 | 22000 | 124 | 0.6 | 2 | 16 | 20 | Ethylene terephthalate 96 Ethylene isophthalate 4 | | | | | | 85 |
| Example 22 | Ethylene terephthalate 96 Ethylene isophthalate 4 | 0 | Acid-modified polyethylene | 10 | 8400 | 125 | 0.8 | 2 | 8 | 20 | Ethylene terephthalate 96 Ethylene isophthalate 4 | 0.16 | 247 | 4.5 | 0.12 | 254 | 85 |
| Example 23 | Ethylene terephthalate 96 Ethylene isophthalate 4 | 0 | Acid-modified polyethylene | 30 | 23000 | 123 | 0.4 | 2 | 16 | 20 | Ethylene terephthalate 96 Ethylene isophthalate 4 | 0.08 | 247 | 5.0 | 0.12 | 254 | 85 |
| Example 24 | Ethylene terephthalate 96 Ethylene isophthalate 4 | 0 | Acid-modified polyethylene | 30 | 23000 | 123 | 0.6 | 2 | 16 | 20 | Ethylene terephthalate 96 Ethylene isophthalate 4 | 0.12 | 247 | 4.8 | 0.12 | 254 | 85 |
| Example 25 | Ethylene terephthalate 96 Ethylene isophthalate 4 | 0 | Acid-modified polyethylene | 30 | 23000 | 123 | 0.8 | 2 | 16 | 20 | Ethylene terephthalate 96 Ethylene isophthalate 4 | 0.16 | 247 | 4.7 | 0.11 | 254 | 85 |
| Example 26 | Ethylene terephthalate 96 Ethylene isophthalate 4 | 2 | Acid-modified polyethylene | 30 | 23000 | 123 | 0.5 | 5 | 14 | 28 | Ethylene terephthalate 96 Ethylene isophthalate 4 | 0.18 | 247 | 4.9 | 0.12 | 254 | 85 |
| Example 27 | Ethylene terephthalate 96 Ethylene isophthalate 4 | 0 | Acid-modified polyethylene | 18 | 52000 | 123 | 0.6 | 2 | 16 | 20 | Ethylene terephthalate 96 Ethylene isophthalate 4 | 0.12 | 247 | 4.8 | 0.13 | 254 | 85 |
| Example 28 | Ethylene terephthalate 96 Ethylene isophthalate 4 | 0 | Acid-modified polyethylene | 50 | 30000 | 135 | 0.6 | 2 | 16 | 20 | Ethylene terephthalate 96 Ethylene isophthalate 4 | 0.12 | 247 | 5.1 | 0.15 | 254 | 85 |
| Example 29 | Ethylene terephthalate 96 Ethylene isophthalate 4 | 0 | Oxidized polypropylene | 20 | 3000 | 110 | 0.8 | 2 | 16 | 20 | Ethylene terephthalate 96 Ethylene isophthalate 4 | 0.16 | 247 | 4.4 | 0.11 | 254 | 85 |
| Example 30 | Ethylene terephthalate 96 Ethylene isophthalate 4 | 0 | Oxidized polyethylene | 35 | 8400 | 122 | 0.8 | 2 | 16 | 20 | Ethylene terephthalate 96 Ethylene isophthalate 4 | 0.16 | 247 | 4.6 | 0.12 | 254 | 85 |

TABLE 2-continued

| Example | | | | | | | | | | | | | |
|---|---|---|---|---|---|---|---|---|---|---|---|---|---|
| 31 | Ethylene terephthalate 96 Ethylene isophthalate 4 | 0 | Oxidized polypropylene | 30 | 22000 | 124 | 0.6 | 2 | 16 | 20 | 0.12 | 247 | 4.7 | 0.13 | 254 | 85 |

TABLE 3

| | Resin composition [mol %] | TiO₂ amount [wt %] | Lubricant component | Acid value of lubricant component [mg KOH/g] | Weight average molecular weight of lubricant component | Melting point of lubricant component [° C.] | Added amount of lubricant component [wt %] | Thickness [μm] | Resin melting point [° C.] | Polar component of surface free energy [mN/m] | Static friction coefficient at 145° C. | Laminate conditions Metal sheet temperature [° C.] | Laminate roll temperature [° C.] |
|---|---|---|---|---|---|---|---|---|---|---|---|---|---|
| Comparative Example 1 | Ethylene terephthalate 96 Ethylene isophthalate 4 | 0 | Polyethylene wax | 0 | 37000 | 125 | 0.005 | 20 | 247 | 3.9 | 0.17 | 256 | 85 |
| Comparative Example 2 | Ethylene terephthalate 96 Ethylene isophthalate 4 | 0 | Polyethylene wax | 0 | 37000 | 125 | 0.10 | 20 | 247 | 3.0 | 0.11 | 256 | 85 |
| Comparative Example 3 | Ethylene terephthalate 96 Ethylene isophthalate 4 | 0 | Polyethylene wax | 0 | 37000 | 125 | 0.20 | 20 | 247 | 2.8 | 0.10 | 256 | 85 |
| Comparative Example 4 | Ethylene terephthalate 96 Ethylene isophthalate 4 | 16 | Polyethylene wax | 0 | 37000 | 125 | 0.10 | 20 | 247 | 3.1 | 0.12 | 256 | 85 |
| Comparative Example 5 | Ethylene terephthalate 96 Ethylene isophthalate 4 | 16 | Polyethylene wax | 0 | 37000 | 125 | 0.20 | 20 | 247 | 2.9 | 0.11 | 256 | 85 |
| Comparative Example 6 | Ethylene terephthalate 96 Ethylene isophthalate 4 | 0 | Polypropylene wax | 0 | 42000 | 150 | 0.05 | 20 | 247 | 3.2 | 0.12 | 256 | 85 |
| Comparative Example 7 | Ethylene terephthalate 94 Ethylene isophthalate 6 | 0 | Polypropylene wax | 0 | 42000 | 150 | 0.05 | 20 | 244 | 3.3 | 0.13 | 256 | 75 |
| Comparative Example 8 | Ethylene terephthalate 96 Ethylene isophthalate 4 | 16 | Acid-modified polyethylene | 30 | 23000 | 123 | 1.1 | 20 | 247 | 3.4 | 0.10 | 256 | 85 |
| Comparative Example 9 | Ethylene terephthalate 96 Ethylene isophthalate 4 | 16 | Stearic acid | 200 | 280 | 70 | 0.20 | 20 | 247 | 3.4 | 0.14 | 256 | 85 |

TABLE 4

| | A | | | | | | | | | | |
|---|---|---|---|---|---|---|---|---|---|---|---|
| | Outermost layer | | | | | | | | Intermediate layer | | |
| | Resin composition [mol %] | TiO$_2$ amount [wt %] | Lubricant component | Acid value of lubricant component [mg KOH/g] | Weight average molecular weight of lubricant component | Melting point of lubricant component [° C.] | Added amount of lubricant component [wt %] | Thickness [μm] | Resin composition [mol %] | TiO$_2$ amount [wt %] | Thickness [μm] |
| Comparative Example 10 | Ethylene terephthalate 96 Ethylene isophthalate 4 | 0 | — | — | — | — | 0 | 2 | Ethylene terephthalate 96 Ethylene isophthalate 4 | 20 | 16 |
| Comparative Example 11 | Ethylene terephthalate 96 Ethylene isophthalate 4 | 0 | Polyethylene wax | 0 | 37,000 | 125 | 0.1 | 2 | Ethylene terephthalate 96 Ethylene isophthalate 4 | 20 | 16 |
| Comparative Example 12 | Ethylene terephthalate 96 Ethylene isophthalate 4 | 0 | Polyethylene wax | 0 | 37,000 | 125 | 0.2 | 2 | Ethylene terephthalate 96 Ethylene isophthalate 4 | 20 | 16 |
| Comparative Example 13 | Ethylene terephthalate 96 Ethylene isophthalate 4 | 0 | Polyethylene wax | 0 | 37,000 | 125 | 0.3 | 2 | Ethylene terephthalate 96 Ethylene isophthalate 4 | 20 | 16 |
| Comparative Example 14 | Ethylene terephthalate 96 Ethylene isophthalate 4 | 0 | Polyethylene wax | 0 | 37,000 | 125 | 0.4 | 2 | Ethylene terephthalate 96 Ethylene isophthalate 4 | 20 | 16 |
| Comparative Example 15 | Ethylene terephthalate 96 Ethylene isophthalate 4 | 0 | Polyethylene wax | 0 | 37,000 | 125 | 0.45 | 2 | Ethylene terephthalate 96 Ethylene isophthalate 4 | 20 | 16 |
| Comparative Example 16 | Ethylene terephthalate 96 Ethylene isophthalate 4 | 0 | Polyethylene wax | 0 | 37,000 | 125 | 1.0 | 2 | Ethylene terephthalate 96 Ethylene isophthalate 4 | 20 | 16 |
| Comparative Example 17 | Ethylene terephthalate 96 Ethylene isophthalate 4 | 0 | Polypropylene wax | 0 | 42,000 | 150 | 0.5 | 2 | Ethylene terephthalate 96 Ethylene isophthalate 4 | 20 | 16 |

TABLE 4-continued

| | | Lowermost layer | | | | | | | | Surface outer face resin layer | | | | | | Laminate conditions | |
|---|---|---|---|---|---|---|---|---|---|---|---|---|---|---|---|---|---|
| | | B | | | | | | | | | | | | | | | |
| | Resin composition [mol %] | TiO₂ amount [wt %] | Lubricant component | Acid value of lubricant component [mg KOH/g] | Weight average molecular weight of lubricant component | Melting point of lubricant component [° C.] | Added amount of lubricant component [wt %] | Thickness [μm] | TiO₂ amount [wt %] | Thickness [μm] | Added amount of lubricant component [wt %] | Resin melting point [° C.] | Polar component of surface free energy [mN/m] | Static friction coefficient at 145° C. | Metal sheet temperature [° C.] | Laminate roll temperature [° C.] |
| Comparative Example 10 | Ethylene terephthalate 96 Ethylene isophthalate 4 | 0 | — | — | — | — | 0 | 2 | 16 | 20 | 0 | 247 | 5.0 | 0.17 | 254 | 85 |
| Comparative Example 11 | Ethylene terephthalate 96 Ethylene isophthalate 4 | 0 | Polyethylene wax | 0 | 37000 | 125 | 0.1 | 2 | 16 | 20 | 0.02 | 247 | 3.4 | 0.13 | 254 | 85 |
| Comparative Example 12 | Ethylene terephthalate 96 Ethylene isophthalate 4 | 0 | Polyethylene wax | 0 | 37000 | 125 | 0.2 | 2 | 16 | 20 | 0.04 | 247 | 3.3 | 0.12 | 254 | 85 |
| Comparative Example 13 | Ethylene terephthalate 96 Ethylene isophthalate 4 | 0 | Polyethylene wax | 0 | 37000 | 125 | 0.3 | 2 | 16 | 20 | 0.06 | 247 | 3.2 | 0.11 | 254 | 85 |
| Comparative Example 14 | Ethylene terephthalate 96 Ethylene isophthalate 4 | 0 | Polyethylene wax | 0 | 37000 | 125 | 0.4 | 2 | 16 | 20 | 0.08 | 247 | 3.0 | 0.11 | 254 | 85 |
| Comparative Example 15 | Ethylene terephthalate 96 Ethylene isophthalate 4 | 0 | Polyethylene wax | 0 | 37000 | 125 | 0.45 | 2 | 16 | 20 | 0.09 | 247 | 2.8 | 0.11 | 254 | 85 |
| Comparative Example 16 | Ethylene terephthalate 96 Ethylene isophthalate 4 | 0 | Polyethylene wax | 0 | 37000 | 125 | 1.0 | 2 | 16 | 20 | 0.20 | 247 | 2.0 | 0.10 | 254 | 85 |
| Comparative Example 17 | Ethylene terephthalate 96 Ethylene isophthalate 4 | 0 | Polypropylene wax | 0 | 42000 | 150 | 0.5 | 2 | 16 | 20 | 0.10 | 247 | 3.0 | 0.10 | 254 | 85 |

TABLE 5

|  | Water | Glycerin | Formamide | Ethylene glycol | Diethylene glycol |
|---|---|---|---|---|---|
| $\gamma_L^d$ (dyne · cm$^{-1}$ = mN · m$^{-1}$) | 21.5 | 38.6 | 34.3 | 32.8 | 38.1 |
| $\gamma_L^p$ (dyne · cm$^{-1}$ = mN · m$^{-1}$) | 50.3 | 24.4 | 23.6 | 15.2 | 6.70 |
| $\gamma_L$ (dyne · cm$^{-1}$ = mN · m$^{-1}$) | 71.8 | 63.0 | 57.9 | 48.0 | 44.8 |

TABLE 6

|  | Ink adhesiveness | Formability |
|---|---|---|
| Example 1 | B | A |
| Example 2 | B | A |
| Example 3 | A | A |
| Example 4 | A | A |
| Example 5 | A | A |
| Example 6 | A | A |
| Example 7 | B | A |
| Example 8 | A | A |
| Example 9 | A | A |
| Example 10 | A | A |
| Example 11 | A | A |
| Example 12 | A | B |
| Example 13 | A | A |
| Example 14 | B | A |
| Example 15 | A | A |
| Example 16 | A | A |
| Example 17 | A | A |
| Example 18 | A | A |
| Example 19 | A | A |
| Example 20 | A | A |
| Example 21 | A | A |
| Example 22 | A | A |
| Example 23 | A | A |
| Example 24 | A | A |
| Example 25 | A | A |
| Example 26 | A | A |
| Example 27 | A | A |
| Example 28 | A | B |
| Example 29 | B | A |
| Example 30 | A | A |
| Example 31 | A | A |
| Comparative Example 1 | B | D |
| Comparative Example 2 | D | A |
| Comparative Example 3 | D | A |
| Comparative Example 4 | D | A |
| Comparative Example 5 | D | A |
| Comparative Example 6 | D | A |
| Comparative Example 7 | C | A |
| Comparative Example 8 | C | B |
| Comparative Example 9 | C | B |
| Comparative Example 10 | A | D |
| Comparative Example 11 | C | A |
| Comparative Example 12 | C | A |
| Comparative Example 13 | D | A |
| Comparative Example 14 | D | A |
| Comparative Example 15 | D | A |
| Comparative Example 16 | D | A |
| Comparative Example 17 | D | A |

INDUSTRIAL APPLICABILITY

Aspects of the present invention can provide a resin-coated metal sheet for a container that can achieve both inhibition of breaking or scraping of the resin coating layer along with processing and good appearance after printing.

REFERENCE SIGNS LIST

1 Resin-coated metal sheet for container
2 Metal sheet
3, 4 Resin coating layer
3a Outermost layer
3b Intermediate layer
3c Lowermost layer

The invention claimed is:

1. A resin-coated metal sheet for a container, comprising:
a metal sheet;
a first resin coating layer provided on an inner face of the metal sheet; and
a second resin coating layer provided on an outer face of the metal sheet, wherein
a polar component of surface free energy of the second resin coating layer is 3.6 mN/m to 5.2 mN/m, after the second resin coating layer is subjected to heat treatment at a melting point of the second resin coating layer plus 8° C. for 2 minutes, and
a static friction coefficient of the second resin coating layer, at 145° C., is 0.16 or less.

2. The resin-coated metal sheet for the container according to claim 1, wherein the second resin coating layer has a polyester resin having a melting point of 230° C. to 254° C. as a main component.

3. The resin-coated metal sheet for the container according to claim 1, wherein the second resin coating layer contains 0.010% by mass to 1.0% by mass of a lubricant component.

4. The resin-coated metal sheet for the container according to claim 2, wherein the second resin coating layer contains 0.010% by mass to 1.0% by mass of a lubricant component.

5. The resin-coated metal sheet for the container according to claim 3, wherein the lubricant component is an acid-modified polyolefin or an oxidized polyolefin and has an acid value of 1.0 mg KOH/g to 100 mg KOH/g.

6. The resin-coated metal sheet for the container according to claim 4, wherein the lubricant component is an acid-modified polyolefin or an oxidized polyolefin and has an acid value of 1.0 mg KOH/g to 100 mg KOH/g.

7. The resin-coated metal sheet for the container according to claim 1, wherein the second resin coating layer contains 30% by mass or less of titanium oxide.

8. The resin-coated metal sheet for the container according to claim 2, wherein the second resin coating layer contains 30% by mass or less of titanium oxide.

9. The resin-coated metal sheet for the container according to claim 3, wherein the second resin coating layer contains 30% by mass or less of titanium oxide.

10. The resin-coated metal sheet for the container according to claim 4, wherein the second resin coating layer contains 30% by mass or less of titanium oxide.

11. The resin-coated metal sheet for the container according to claim 7, wherein
the second resin coating layer has at least a three-layer structure including an outermost layer, an intermediate layer, and a lowermost layer,
thicknesses of the outermost layer and the lowermost layer are 1.0 μm to 5.0 μm,
a thickness of the intermediate layer is 6.0 μm to 30 μm,
each of the outermost layer and the lowermost layer contains 0.0% by mass to 2.0% by mass of titanium oxide, and
the intermediate layer contains 10% by mass to 30% by mass of titanium oxide.

12. The resin-coated metal sheet for the container according to claim 8, wherein
the second resin coating layer has at least a three-layer structure including an outermost layer, an intermediate layer, and a lowermost layer,
thicknesses of the outermost layer and the lowermost layer are 1.0 µm to 5.0 µm,
a thickness of the intermediate layer is 6.0 µm to 30 µm,
each of the outermost layer and the lowermost layer contains 0.0% by mass to 2.0% by mass of titanium oxide, and
the intermediate layer contains 10% by mass to 30% by mass of titanium oxide.

13. The resin-coated metal sheet for the container according to claim 9, wherein
the second resin coating layer has at least a three-layer structure including an outermost layer, an intermediate layer, and a lowermost layer,
thicknesses of the outermost layer and the lowermost layer are 1.0 µm to 5.0 µm,
a thickness of the intermediate layer is 6.0 µm to 30 µm,
each of the outermost layer and the lowermost layer contains 0.0% by mass to 2.0% by mass of titanium oxide, and
the intermediate layer contains 10% by mass to 30% by mass of titanium oxide.

14. The resin-coated metal sheet for the container according to claim 10, wherein
the second resin coating layer has at least a three-layer structure including an outermost layer, an intermediate layer, and a lowermost layer,
thicknesses of the outermost layer and the lowermost layer are 1.0 µm to 5.0 µm,
a thickness of the intermediate layer is 6.0 µm to 30 µm,
each of the outermost layer and the lowermost layer contains 0.0% by mass to 2.0% by mass of titanium oxide, and
the intermediate layer contains 10% by mass to 30% by mass of titanium oxide.

15. A resin-coated metal sheet for a container, comprising:
a metal sheet;
a first resin coating layer provided on an inner face of the metal sheet; and
a second resin coating layer provided on an outer face of the metal sheet,
the second resin coating layer containing:
polyester resin having a melting point of 230° C. to 254° C. as a main component; and
0.010% by mass to 1.0 by mass of a lubricant component, the lubricant component being an acid-modified polyolefin or an oxidized polyolefin and has a weight average molecular weight of 2,500 or more and less than 80,000 and an acid value of 1.0 mg KOH/g to 100 mg KOH/g.

16. The resin-coated metal sheet for the container according to claim 15, wherein the second resin coating layer contains 30% by mass or less of titanium oxide.

17. The resin-coated metal sheet for the container according to claim 16, wherein
the second resin coating layer has at least a three-layer structure including an outermost layer, an intermediate layer, and a lowermost layer,
thicknesses of the outermost layer and the lowermost layer are 1.0 µm to 5.0 µm,
a thickness of the intermediate layer is 6.0 µm to 30 µm,
each of the outermost layer and the lowermost layer contains 0.0% by mass to 2.0% by mass of titanium oxide, and
the intermediate layer contains 10% by mass to 30% by mass of titanium oxide.

* * * * *